3,030,211
FOOD PRODUCTS CONTAINING DEAMIDIZED GLIADIN

Clarence E. McDonald, Albany, Calif., assignor to the United States of America as represented by the Secretary of Agriculture
No Drawing. Filed Dec. 22, 1960, Ser. No. 77,765
10 Claims. (Cl. 99—14)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its primary objects the provision of novel food products containing deamidized gliadin. Further objects and advantages of the invention will be apparent from the following description, wherein parts and percentages are by weight unless otherwise specified.

In preparing many food products, notably cake frostings, dessert toppings, candies, meringues, and the like, it is conventional to include a proteinous material with the other ingredients. Egg white is largely used for this purpose although other proteinous materials such as soy proteins, modified milk proteins, and gelatin have been advocated or are even used commercially. The protein ingredient acts in various roles depending on the character of the product. For example, in aerated products the protein acts as a foaming agent, in products containing both fat and water components the protein acts as an emulsifier binding these dissimilar materials into a uniform blend. In general, the protein ingredient may be described as a stabilizer in that it maintains the original properties of the composition and prevents such undesirable actions as release of air from aerated products, separation of fat from aqueous components, leakage of watery serum from emulsified components, drying-out, loss of original smooth texture by development of graininess, etc.

In accordance with the invention there are provided food products which contain deamidized gliadin as the sole protein ingredient, or which contain deamidized gliadin in conjunction with other proteins. As well known in the art, gliadin is a protein which is found in various cereals. A convenient source of gliadin is gum gluten obtained from wheat. Gliadin comprises about one-half the protein in crude gum gluten and can be isolated therefrom by extraction with aqueous alcohol. Deamidized gliadin is prepared by subjecting gliadin to very dilute acid hydrolysis under controlled conditions. In this hydrolysis, the primary amide groups (—$CONH_2$) occurring along the protein chain are hydrolyzed to carboxyl groups (—COOH) without significant rupturing of the peptide linkages which form the protein chain. Methods of preparing deamidized gliadin are known in the art and form no part of the present invention. It is evident that by changing the conditions of hydrolysis, one may vary the proportion of $CONH_2$ groups which are converted into COOH groups. For purposes of the invention, it is preferred to use deamidized gliadins wherein at least 20% of the amide groups have been converted to carboxyl groups. A typical method of preparing deamidized gliadin is demonstrated in Example VI. This substance was used in preparing the various food products described in Examples I to V.

It is to be particularly observed that deamidized gliadin offers considerable advantages—important in the preparation of food products—as compared with unmodified (native) gliadin. Several items which demonstrate these advantages are explained below.

Unmodified gliadin is very sensitive to the presence of salts. As a consequence, unmodified gliadin cannot be successfully employed in products containing salts. (It is, of course, obvious that ordinary salt is a common flavoring ingredient of many of the food products under consideration here. Also, the water used in making the products may be hard and thus contain mineral salts.) When salt is added to unmodified gliadin solutions, the gliadin precipitates and foams of low volume are obtained. On the other hand, deamidized gliadin is insensitive to salt in that there is no precipitation or loss of foam volume.

Unmodified gliadin is sensitive to pH and is insoluble at neutral pH's and above. This means that the protein cannot be used in food products having such a pH range. On the other hand, deamidized gliadin is soluble at pH's in the range 5 to 8 and thus can be used in any food products having such pH.

Unmodified gliadin is sensitive to heat. For example, in preparing candies if a hot sugar syrup is added to an unmodified gliadin foam, the foam collapses. Deamidizd gliadin, on the other hand, does not display this characteristic and hot sugar syrups may be blended with deamidized gliadin foams with retention of the foam volume and the eventual production of a candy of a desirable light and porous texture.

In general, food products prepared with deamidized gliadin are superior to those prepared with unmodified gliadin in these respects: smoother texture, higher gloss, and improved stability—including stability against leakage of watery serum, prevention of formation of graininess or crystallinity, and prevention of loss of volume in aerated products.

The invention is of wide versatility and may be utilized in the preparation of all types of food products wherein a stabilizer is indicated or desirable. In a broad sense, the invention may be applied to any food product wherein dissimilar or potentially-incompatible ingredients need to be preserved in stable physical combination. The ingredients may be dissimilar for such reasons as being in different states of matter, for example, one being a solid and the other a liquid. Such a case is presented with icings which mainly consist of (a) sugar crystals and (b) water, or, more accurately, aqueous sugar solution. Another instance is where one ingredient is a gas and another a liquid—this is the situation in foamed icings, meringues, angel food batters, divinity-type candy mixes, etc. Here, one of the aims is to keep the air from being released so that the product will maintain its cellular or foamy structure. Dissimilarity or incompatibility may arise through differences in chemical properties of the respective ingredients. Such a situation is invoked in combining fatty and aqueous substances. This is the case, for instance, with products containing fat combined with water or sugar solutions where it is necessary to preserve the fat and the water or aqueous sugar phases in emulsified form. A complex type of incompatibility will obviously be the case where both (a) different states of matter and (b) different chemical properties are involved. Such is the situation with icings containing edible fat, sugar crystals, water, and air. By addition of deamidized gliadin, all these types of products can be stabilized so that they will maintain their original characteristics. The stabilization effect involves preserving gloss, texture, volume, and other significant characteristics.

A typical application of the invention is in the preparation of icings. As well known in the art, there are various forms of icings but in general their main ingredients are sugar and water. A simple form of icing is made by intimately mixing powdered sugar, water, and deamidized gliadin. The proportions of sugar and water are so adjusted that the mixture has the proper texture for a desired use. This may range from a stiff plastic texture for use in coating cakes or other pastry to a pasty texture for application to soda fountain confections as a dessert topping. Other conventional ingredients such as flavorings, colorings, pre-gelatinized starch, etc. may be added as desired. Generally, deamidized gliadin is added in a proportion about 0.1 to 5% based on the weight of the mixture. For preparing icings of a creamier texture it is desirable to add edible fat to the mixture; for this purpose one may use such materials as hydrogenated vegetable shortenings, butter, margarine, etc. A typical formulation for an icing of this type contains the approximate proportions of the following ingredients: Edible fat, 40%; confectioners' sugar, 53%; water, 6%; and deamidized gliadin, 0.7%. A minor amount of flavoring as, for example, vanilla extract, lemon extract, etc. is added as desired. It is obvious that with this type of icing the proportions of fat, sugar, and water may be adjusted to attain a desired texture. Generally, the texture of icings is improved by aeration, that is, whipping air into the mixture, and any of the icings prepared with deamidized gliadin may be aerated. An advantage of the use of deamidized gliadin is that it acts as a foaming agent and as explained herein above, is relatively insensitive to salt, pH, and heat. The invention can be applied not only to cold-water type icings, fondant icings, boiled icings, and icings containing edible fat, but also to icings of the marshmallow type. The latter are basically an aerated sugar syrup. Addiiton of deamidized gliadin thereto provides good stability in preventing seepage of water, deaeration, etc. In general, therefore, icings of all kinds may be prepared with deamidized gliadin and these products retain their original gloss and texture for long periods without developing graininess, weeping of liquid, or loss of volume. The expression "icing" is used herein in a general sense as including all the food products variously termed as icings, frostings, cake fillings, dessert toppings, fillings for chocolates, bon-bons or other confections, meringues, and the like. As noted above, the deamidized gliadin is generally added in a proportion of about 0.1 to 5%.

Deamidized gliadine may be employed in preparing meringues which, as well known in the art, are essentially a protein-stabilized, sweetened foam. Ordinarily, meringues are prepared by whipping egg white and then folding in sugar to sweeten the preparation. In applying the invention to the preparation of meringues, deamidized gliadin is dissolved in water in a concentration of about 10% and whipped until a stiff foam is formed. Sugar is then incorporated to a desired level of sweetness. The resulting meringue may be applied to pies and browned in the oven or the meringue may be shaped into shells or other shapes and browned in the oven for use as receptacles for dessert fillings. Generally, pie meringues made with deamidized gliadin tend to be too moist and soft for commercial bakery products and it is preferred to use as the protein component egg white solids and deamidized gliadin in a proportion of 80 to 90% of the former and 20 to 10% of the latter.

Deamidized gliadin is of advantage in preparing candies, particularly those of the foamed type, wherein the product is desired to have a light and porous structure. In preparing these candies an aqueous solution of deamidized gliadin (for example, 10% concentration) is whipped into a foam and then a hot sugar syrup is incorporated into the foam. An advantage of the use of deamidized gliadin in this connection is that the foam is not destroyed by contact with the hot syrup so that the candy has a light porous texture as desired, for example, with products of the divinity type. Flavorings, colorings, chopped nuts, or other conventional candy ingredients may obviously be incorporated into the hot mix, as desired.

Another field of application of the invention lies in preparing bakery products. Thus, deamidized gliadin may be substituted for egg white in preparing cakes, pastries, etc.

The invention may also be utilized in preparing dry mixes which are adapted for ready preparation of icings by incorporation with water. Such products are prepared by intimately blending sugar, preferably in finely divided form, with a minor proportion of deamidized gliadin. Minor amounts of other ingredients such as flavorings, color, acidulants, carbohydrate thickeners may be added as desired. A typical formulation is given below:

| Ingredients: | Parts |
| --- | --- |
| Deamidized gliadin | 1 |
| Sugar, superfine | 25 |
| Corn syrup solids | 6 |
| Salt | 0.045 |
| Pre-gelatinized starch | 0.9 |

The dry mix is utilized by blending it with 17 parts of water and then whipping it until stiff peaks are formed.

The utilization of deamidized gliadin in preparing food products does not involve any difficulty from the standpoint of procedure. The various food products of the invention are prepared by the same techniques which are conventional in the art of cookery. Application of the invention thus merely involves substituting deamidized gliadin for egg white, dried egg white solids, or other protein heretofore employed in the known recipes or formulations. In most instances it is preferred that the sole protein ingredient of the food product be deamidized gliadin. However, this is not essential and in many cases good results are attained wherein the protein ingredient comprises as little as 10% of deamidized gliadin and the remainder a protein of the type hitherto described for use in stabilizing food products, for example, egg white solids, soybean protein, etc. Generally, the proportion of deamidized gliadin in the food product will range from about 0.1 to 5%. It is obvious that a product such as a meringue which is largely a protein foam will require a larger proportion of deamidized gliadin than a product such as an icing or candy which is largely composed of sugar.

The invention is further demonstrated by the following illustrative examples. For comparative purposes, several of the food products were made with unmodified gliadin.

*Example 1—Butter Cream-Type Frosting*

Three samples of butter cream-type frosting were prepared as described below. Sample A was prepared with deamidized gliadin in accordance with the invention, sample B was prepared with unmodified gliadin and sample C contained neither type of gliadin.

| Ingredients | A. Deamidized gliadin | B. Unmodified gliadin | C. No protein |
| --- | --- | --- | --- |
| Shortening, lbs | 0.25 | 0.25 | 0.25 |
| Margarine, lbs | 0.25 | 0.25 | 0.25 |
| Vanilla extract, ml | 6.7 | 6.7 | 6.7 |
| Lemon flavoring, ml | 1.0 | 1.0 | 1.0 |
| Confectioners' sugar, lbs | 0.67 | 0.67 | 0.67 |
| 10% Deamidized gliadin solution, ml | 40 | 0 | 0 |
| 10% Unmodified gliadin solution, ml | 0 | 40 | 0 |
| Water, ml | 0 | 0 | 40 |

*Procedure.*—The ingredients were mixed in a standard Hobart mixer. First, the shortening and margarine were blended, then the vanilla and lemon flavoring were added, and then the sugar. Finally the gliadin solutions or water were added and the mixture beaten until uniform and creamy in texture.

Each frosting was placed in an aluminum dish, covered with cellophane, and alowed to stand at room temperature. The following observations were made as the storage continued:

| Time of storage, days | A. Deamidized gliadin | B. Unmodified gliadin | C. No protein |
|---|---|---|---|
| 0 | Creamy taste. High gloss. No leakage. | Creamy taste. Dull. Leakage of water. | Creamy taste. Medium gloss. Leakage of water. |
| 4 | Smooth texture. High gloss. No leakage. | Grainy. Dull. Leakage of water. | Grainy. Medium gloss. Leakage of water. |
| 9 | No crust formed, still glossy. | Dried-out crust formed on surface. | Dried-out crust formed on surface. |
| 12 | No leakage. Surface gloss reduced to medium gloss. | | |

*Example II—Pie Meringues*

Four samples of meringue were prepared as described below. Samples A and B contained deamidized gliadin (in different proportions) in accordance with the invention, sample C contained unmodified gliadin, and sample D contained egg white as the sole protein material.

| Ingredients | A. Deamidized gliadin | B. Deamidized gliadin | C. Unmodified gliadin | D. Egg white, alone |
|---|---|---|---|---|
| Egg white, ml | 47 | 54 | 47 | 60 |
| Cream of tartar, mg | 625 | 818 | 625 | 900 |
| Sugar, g | 50 | 50 | 50 | 50 |
| 10% Deamidized gliadin solution, ml | 13 | 6 | 0 | 0 |
| 10% Unmodified gliadin solution, ml | 0 | 0 | 13 | 0 |

*Method.*—Egg white and cream of tartar with or without gliadin solution, as appropriate to the different samples, whipped until frothy, then the sugar was added while still beating and the mixture whipped to the usual stiffness. The resulting foams were placed on lemon pie filling and browned 3 to 4 minutes at 425° F. The following results were observed:

*Beating Properties.*—It was observed that the unmodified gliadin precipitated so that it required twice as long (1.5 min.) to whip the mixture (sample C) as was required with samples A, B, and D (0.75 min. beating time).

*Surface Properties.*—The peaks and ridges of the browned meringue containing unmodified gliadin (C) were not as good as those on samples A, B, and D.

*Body Properties.*—All three meringues had the same rigidity. With regard to texture, the meringues containing deamidized gliadin (A and B) were moister and creamier than the others (C and D).

*Example III—Meringue Shells*

Meringue shells were prepared as described below. Sample A was prepared with deamidized gliadin in accordance with the invention, sample B contained unmodified gliadin.

| Ingredients | A. Deamidized gliadin | B. Unmodified gliadin |
|---|---|---|
| Sugar, g | 135 | 135 |
| Salt, mg | 174 | 174 |
| Vanilla extract, ml | 1.3 | 1.3 |
| 10% Deamidized gliadin solution, ml | 60 | 0 |
| 10% Unmodified gliadin solution, ml | 0 | 60 |

*Method.*—The gliadin solutions after addition of the salt were beaten until stiff, then ⅔ of the sugar was added while beating at slow speed. Finally, the vanilla was added and the remainder of the sugar folded in. Heaping tablespoons of the meringues were placed on cooky sheets, formed into shells and baked at 225° F. for 78 minutes. The following results were observed:

*Beating.*—In preparing sample B (unmodified gliadin) sticky, insoluble material was found on the beater blades and the meringue contained some visible lumps of insoluble gliadin. In preparing sample A (deamidized gliadin) no insoluble material was found on the beater blades, nor were there any lumps in the meringue.

*Properties of baked shells.*—The shells prepared with unmodified gliadin (B) were so fragile that most of them broke and crumbled when removing them from the cooky sheet. The shells prepared with deamidized gliadin (A) could be removed from the sheet without breakage and were useful as receptacles in preparing desserts and the like. They had a finely-porous texture in contrast to the coarse, porous texture of product B.

*Example IV—Divinity Candy*

Samples of candy were prepared as detailed below:

| Ingredients | A. Deamidized gliadin | B. Unmodified gliadin |
|---|---|---|
| Sugar, cups | 2 | 2 |
| Light corn syrup, cups | 0.5 | 0.5 |
| Water, cups | 0.5 | 0.5 |
| Salt, tsp | 1/8 | 0 |
| Vanilla extract, tsp | 1 | 1 |
| 10% Deamidized gliadin solution, ml | 60 | 0 |
| 10% Unmodified gliadin solution, ml | 0 | 60 |

*Procedure.*—The sugar, syrup, and water were boiled until a temperature of 129° C. was reached. The gliadin solution was beaten to a stiff-peak stage and the hot syrup added slowly thereto with beating. The mixture was beaten until stiff, the vanilla was added and beating continued until the product held its shape and began to lose its luster. The mix was then dropped in teaspoon lots onto wax paper, allowed to harden (2 hours) and then stored in closed containers. The following results were observed:

It was observed that the foam with unmodified gliadin (B) broke down during addition of the hot syrup. The resulting candy was heavy and fondant-like. In the case of sample A there was not destruction of the foam on addition of the hot syrup and the candy was of a light, fluffy texture, characteristic of good quality divinity candy made with egg white.

*Example V—Fluffy White Frosting*

Cake frosting was prepared with deamidized gliadin and unmodified gliadin as detailed below:

| Ingredients | A. Deamidized gliadin | B. Unmodified gliadin |
|---|---|---|
| 10% Deamidized gliadin solution, ml | 40 | 0 |
| 10% Unmodified gliadin solution, ml | 0 | 40 |
| Sucrose, superfine, g | 99 | 99 |
| Corn syrup (80% solids), g | 30 | 30 |
| Salt, mg | 180 | 180 |
| Pre-gelatinized potato starch, g | 3.6 | 3.6 |
| Water, ml | 22 | 22 |

*Procedure.*—All the ingredients were mixed and the product beaten to whip air into it.

*Results.*—It was observed that in product B the unmodified gliadin was precipitated by action of the salt and the frosting had a "runny" texture. In the case of A, with deamidized gliadin, the product could be beaten to a stiff foam in 3 to 4 minutes and it had a high gloss and proper texture for spreading and remaining in place on a cake.

*Example VI—Preparation of Deamidized Gliadin*

Gliadin extracted from commercial dried gum gluten was dispersed in 0.07 N hydrochloric acid in an amount to furnish a gliadin concentration of 5.5%. The dispersion was heated at 96–98° C. for 3 hours. This treatment hydrolyzed about 28% of the total amide groups as indicated by an increase in ammonia determined by direct analysis of the hydrolysate with ninhydrin reagent. The hydrolysis was achieved without significant splitting of peptide bonds. The deamidized material was recovered by adjustment of the pH to 3.9. After decantation the precipitate was supended in water and its pH adjusted to 5.3 before it was dried by lyophilization. The final product contained 16.4% nitrogen, of which 21.7% was amide nitrogen. For use in preparing the products of Examples I to V, the deamidized gliadin was dissolved in water to provide a 10% solution.

Having thus described the invention, what is claimed is:

1. A food product containing at least two dissimilar ingredients in admixture and as a stabilizer, deamidized gliadin.
2. A food product containing sugar and deamidized gliadin.
3. A food product containing sugar, water, and deamidized gliadin.
4. A food product containing sugar, water, edible fat and deamidized gliadin.
5. A food product having a substantial amount of air incorporated therein, containing, as a foaming agent and stabilizer, deamidized gliadin.
6. An icing containing in intimate admixture sugar, water, and deamidized gliadin.
7. An icing containing in intimate admixture sugar, water, edible fat and deamidized gliadin.
8. An aerated, sweetened foam containing deamidized gliadin.
9. An edible foam containing air, sugar, water, and deamidized gliadin.
10. An edible foam containing air, sugar, edible fat, water, and deamidized gliadin.

References Cited in the file of this patent

UNITED STATES PATENTS

| | | |
|---|---|---|
| 2,301,745 | Otterbacher | Nov. 10, 1942 |
| 2,381,407 | Levinson et al. | Aug. 7, 1945 |
| 2,420,735 | Coffman et al. | May 20, 1947 |

FOREIGN PATENTS

| | | |
|---|---|---|
| 708,806 | Great Britain | May 12, 1954 |